United States Patent [19]

Pozzetti et al.

[11] 3,809,874

[45] May 7, 1974

[54] DEVICE FOR CALCULATING THE MEAN VALUE OF A SUCCESSION OF DATA

[75] Inventors: Mario Pozzetti; Claudio Mordini, both of Bologna, Italy

[73] Assignee: Finike Italiana Marposs- Soc. In Accomandita Semplice di Mario Possati & Co., Bentivoglio, Italy

[22] Filed: July 21, 1972

[21] Appl. No.: 273,712

[30] Foreign Application Priority Data

July 30, 1971 Italy .................................. 3490/71

[52] U.S. Cl.............. 235/183, 235/151.13, 328/127

[51] Int. Cl............................................... G06g 7/18

[58] Field of Search............ 235/151.13, 151.1, 183, 235/193.5; 328/127

[56] References Cited

UNITED STATES PATENTS

| | | | |
|---|---|---|---|
| 3,633,004 | 1/1972 | James | 235/183 |
| 3,541,319 | 11/1970 | James | 235/183 |
| 3,488,482 | 1/1970 | Ley | 235/138 |
| 2,842,740 | 7/1958 | Sparks | 235/193.5 |
| 3,532,862 | 10/1970 | Dahlin | 235/151.1 |

*Primary Examiner*—Felix D. Gruber

*Attorney, Agent, or Firm*—Stevens, Davis, Miller & Mosher

[57] ABSTRACT

A device for calculating the mean value of a succession of data including a storage capacitor memory element for storing the mean value of a succession of input data, and a control element connected to the storage capacitor for controlling the charging and discharging of the capacitor, the control element also applying a predetermined percentage of the last data piece to the memory element and discharging the same percentage of the mean value previously stored in the memory element.

5 Claims, 2 Drawing Figures

DEVICE FOR CALCULATING THE MEAN VALUE OF A SUCCESSION OF DATA

The present invention relates to a circuit for calculating the mean value of a succession of data, said mean value being updated at the arrival of each new piece of data.

Usually the mean value of a succession of data is obtained by effecting the arithmetic mean on a predetermined number of these data. Updating is made for each new piece of data by erasing the oldest piece of data, memorizing the new piece of data and recalculating the mean value.

From the electronic standpoint, for calculating the mean value of N pieces of information, it is necessary to use N memory circuits for storing the N pieces of information and a memory circuit for storing the mean value of the N pieces of information.

If the arithmetic mean value of N+1 pieces of information has to be calculated, it has been necessary to provide the electronic circuit which calculates the mean value with a further memory circuit for memorizing this further piece of information. This system is hardly practical and highly expensive.

The technical problem which the present invention proposes to resolve is to provide an electronic circuit which is simple, cheap, considerably practical, stable and free of drifts, and which calculates the mean value of a predetermined number of data and allows for changing the number of data without any need to modify the structure of the circuit itself.

According to this invention there is provided a cicuit comprising memory means for storing the mean value of the data, control means for charging and discharging the memory means and for applying to the same a predetermined and regulable percentage of the last piece of data and for discharging in the same percentage the mean value previously stored in the memory means.

Figure 1:
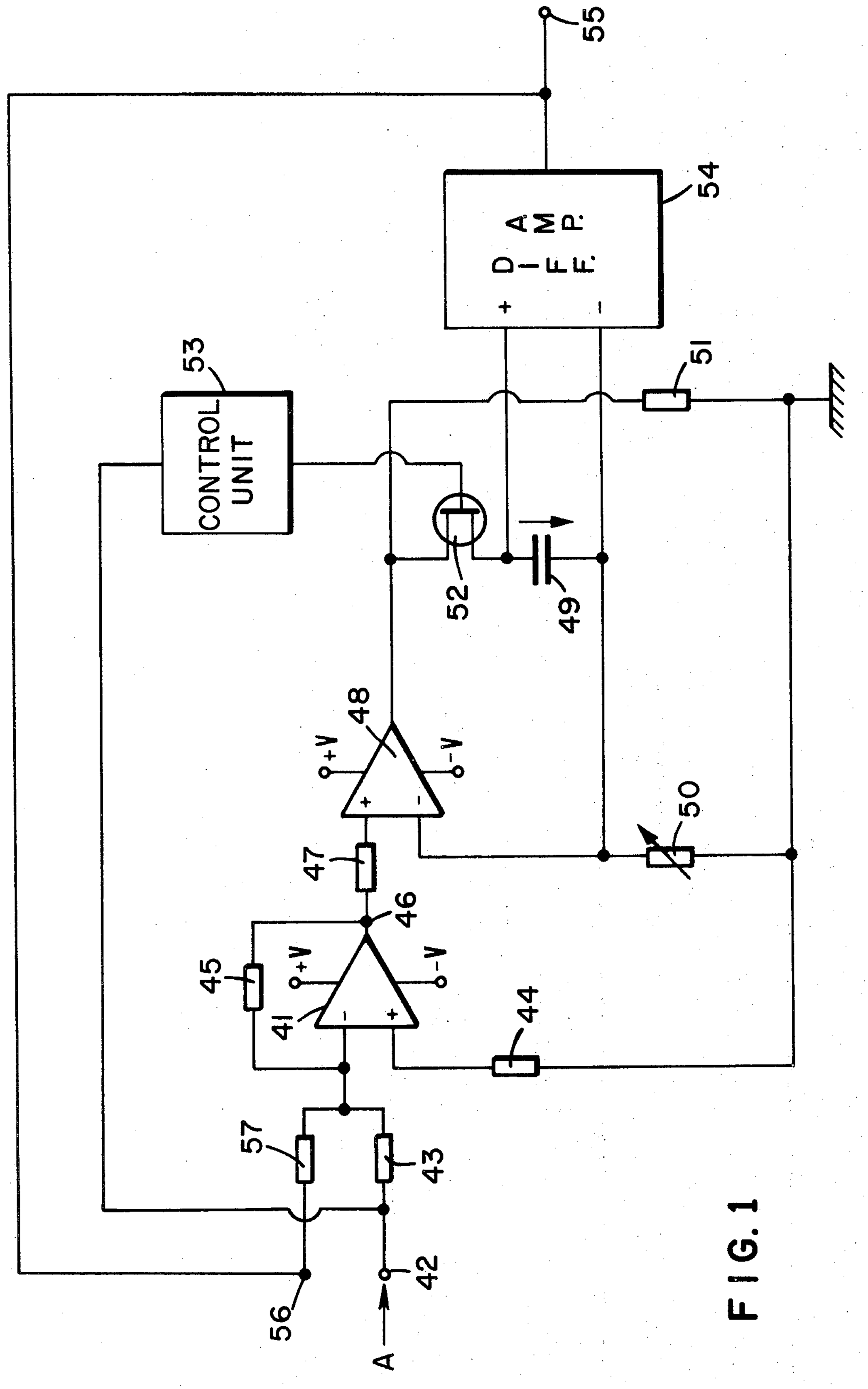
Figure 2:
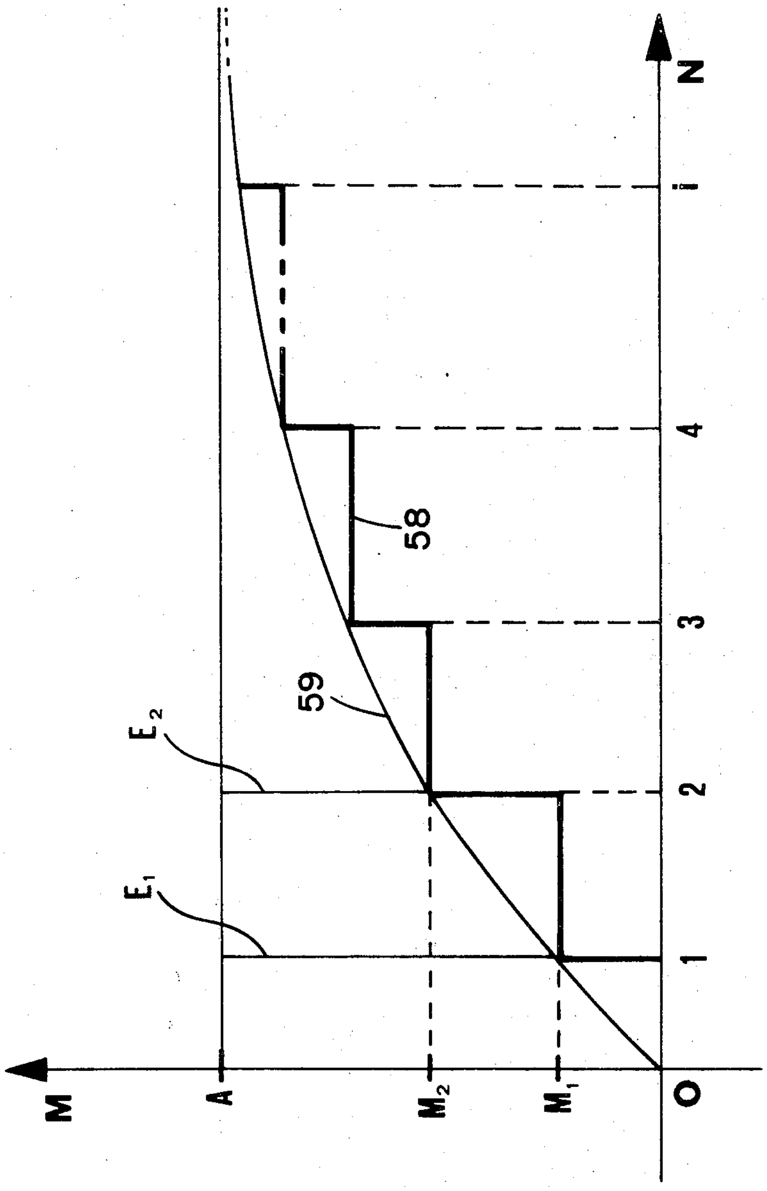

Th following description illustrates a preferred embodiment of the invention, given by way of non-limiting example, with reference to the accompanying drawings, in which:

FIG. 1 shows a circuit according to the invention for calculating the mean value of a succession of data; and FIG. 2 is a diagram which refers to the operation of the circuit of FIG. 1.

With reference to FIG. 1, the instantaneous value of the successive data in the form of, for example, a succession of pulses having either the same or varying amplitudes, arrives at the negative input of an operational amplifier 41 from an input 42 through a resistor 43. The amplifier 41 whose positive input is connected to ground through a resistor 44, is fed with voltage + V and − V and its output is fedback to its negative input by a resistor 45. The amplifier 41, operating as an inverter, supplies a signal to an output 46 which is inverted in phase with respect to the input.

The output signal from the inverter circuit 41 is applied through a resistor 47 to the positive input of an operational amplifier 48, whose output is fedback by a condenser 49 and hence operates as an integrator.

The amplifier 48 is fed with voltages +V and −V and has its negative input biased through a variable resistor 50 to ground and its output connected to ground through a resistor 51. The condenser 49 is charged through a switch consisting of a FET 52 and the charge depends on the value of the resistance 50, which determines the value of the charging current for the condenser.

The FET 52 is controlled by a unit 53, of known type, capable of saturating it and shutting it off. For example, the unit 53 may consist of a monostable multivibrator which normally provides a negative voltage and, when controlled, a positive voltage for a determined time period. Operation of the unit 53 and hence closure of the switch 52 takes place on arrival of each new piece of data. When at the input of the FET 52 there is a sufficiently negative voltage, the FET 52 is off; under this condition, as the connection between the output of the amplifier 48 and the condenser 49 is interrupted, the voltage across the memory or storage condenser does not undergo any variation. However when a positive voltage sufficient to put the FET 52 into a conductive state exists, the memory condenser 49 charges or discharges to an extent dependent on the voltage present at the output of the amplifier 48, the time of closure of the switch 52, the value of the resistor 50 and the capacity of the condenser 49. The voltage present across the condenser 49 is applied to the inputs of a unit gain differential amplifier 54 of sufficiently high input impedance as to render the discharge currents of the condenser 49 neglibile when the switch 52 is open.

The voltage at the output 55 of the amplifier 54, corresponding to the potential difference existing between the plates of the condenser 49, is fed to an input 56 and then through a negative feedback resistor 57 to the negative input of the operational amplifier 41, i.e., to that input to which the successive measured data is fed by way of the resistor 43. This signal carried through the negative feedback chain to the input of the amplifier 41 is the mean value calculated by the described device, as will be more evident from the following description. It is of opposite sign to the instantaneous values of the successive data; therefore the amplifier 41 has at its output 46 a signal which is the difference between the successive instantaneous values and the mean value so calculated. considering the memory condenser 49 initially discharged, the voltage carried through the negative feedback resistor 57 to the negative input of the amplifier 41 will correspond to OV.

When the switch 52 is closed, the memory condenser 49 charges to a certain value which depends on its capacity, the resistor 50, the time of closure of the switch 52 and the voltage present at the output of the amplifier 48.

More precisely if the time of closure of the switch 52 is *t*, the value of the resistor 50 is R, the voltage present at the output 46 s $V_a$ and the capacity of the condenser 49 is C, there is on this latter a voltage variation given by:

$$\Delta V = -V_a \cdot t/R.C = -V_a/K$$

where the quantity R.C/t = K. 1/K represents he voltage percentage by which the memory condenser 49 charges; R, C and *t* are selected in such a manner that $1/K \ll 1$.

More particularly, after the measurement of the first piece of data $A_1$, the voltage at the input 42, indicated by $V_c$, is given by:

$$V_c = A_1$$

At the input 56, as we have considered the memory condenser 49 initially discharged, there will be a voltage $V_d$ given by:

$$V_d = OV$$

At the node 46 there will be a voltage corresponding to the instantaneous value of the data but changed in sign as the amplifier 41 operates as an inverter.

We thus have:

$$V_a = -A_1$$

The voltage $V_1$ to which the memory condenser 49 is charged after the measurement of the first piece of data $A_1$, expressed analytically, is given by the following relationship:

$$V_1 = 1/K.A_1 = M_1$$

where 1/K is again the voltage percentage to which the memory condenser 49 is charged.

The voltage $V_1$ corresponds to the mean value $M_1$ stored in the condenser 49 after the measurement of the first piece of data.

After the measurement of the second piece of data, which can be indicated by $A_2$, the voltage at the node 42 is:

$$V_c = A_2$$

A voltage corresponding to the value stored in the condenser 49 is brought through the negative feedback circuit to the node 56, i.e.:

$$V_d = -M_1$$

At the node 56 the voltage is thus:

$$V_a = -(V_c + V_d) = -(A_2 - M_1)$$

The voltage across the memory condenser 49 after measurement of the data $A_2$ is hence updated to the following value:

$$V_2 = M_1 - 1/K.V_a = M_1 - 1/K.(-(A_2 - M_1)) = M_1 + 1/K.(A_2 - M_1) = M_2$$

Generalizing the foregoing process for calculating the mean value at each successive piece of data measured, a formula can be derived which represents the mean value stored by the memory condenser 49 after the measurement of any piece of data $A_{i+1}$ as a function of the preceding mean value $M_i$.

This value is given by:

$$M_{i+1} = M_i + 1/K.(A_{i+1} - M_i)$$

It hence follows that the mean value $M_{i+1}$ stored in the memory condenser 49 after measurement of the data $A_{i+1}$ is obtained by adding to the value $M_i$ previously memorized 1/K of the new data measured, i.e., $1/K.A_{i+1}$, and subtracting the same percentage of the mean value $M_i$. Updating of the mean for each new data is made on a single memory condenser whose charge and discharge percentages are controlled by a single control circuit. In this manner, by using for the memory circuit a single condenser and controlling the percentage of charge and discharge of the condenser with the same electronic components, those drift and instability problems are eliminated which arise in known mean circuits, which for taking the mean of N pieces of information use N memory circuits for storing the information and a memory circuit for storing the mean value of the N pieces of information.

Let us now consider the particular situation in which the condenser 49 is discharged and the successive data are all of a value equal to a constant A.

In this case the mean value stored by the memory condenser 49 for the first data has the following value:

$$M_1 = 1/K.A$$

After the measurement of the second data the memory condenser 49 updates to the value:

$$M_2 = 1/K.A + 1/K.(A - 1/K.A) \quad (1)$$

After the measurement of the first data of magnitude A the mean value obtained differs from the theoretical value by a quantity which, expressed in analytical form, assumes the following value:

$$E_1 = A - M_1$$

Substituting for $M_1$ the value found above gives: $E_1 = A - 1/K.A = A.(1 - 1/K)$ After noting the second data of magntude A the difference $E_2$ between the mean value $M_2$ and the theoretical mean value is:

$$E_2 = A - M_2$$

Substituting for $M_2$ the value found in (1) gives:

$$E_2 = A - (1/K.A + 1/K.(A. - 1/K.A)) = A.(1-1/K)^2$$

Following the same procedure up to the calculation of the error at the ith data the following equation emerges:

$$E_i = A.(1 - 1/K)^i$$

where $E_i$ represents the difference between the measured mean value and the theoretical mean value at the i-th data. It thus follows that this difference diminishes according to a substantially exponential law as the number of pieces of data measured increases.

By plotting the values obtained on the graph of FIG. 2 in which the abscissa indicates the number of pieces of data and the ordinate indicates the mean value across the memory condenser, a step diagram 58 is obtained which approximates to a curve 59 representing the behaviour of the voltage across the memory condenser 49. From the diagram it can be seen that the curve derived approaches the theoretical mean value but meets the line which defines this mean value only at infinity; in practice however after a limited number of pieces of data the two values differ by a negligible amount. The foregoing procedure remains substantially valid for data which are not all equal.

This mean value $M_1$ stored across the condenser 49 is thus continually available, reversed in sign, at the output 55 of the circuit 54.

In calculating the mean value, the requiement normally exists for a system which is prompt, i.e., which adapts itself very rapidly to a variation in the value of the data arriving, but which also gives a stable value, i.e., not excessively influenced by any anomalous data.

These two requirements are in contrast because in order to obtain the first result the quantity 1/K previously defined must have a value close to 1; for obtaining the second 1/K must have a lower value. Varying 1/K or, if the time of closure of the switch 52 is kept constant, varying the time constant RC of the charge and discharge circuit for the condenser 49, is equivalent to varying the influence of each piece of data on the mean, so as to increase or reduce the influence of the last pieces of data. In order to obtain the same result by using an arithmetic mean circuit instead of the exponential damping mean circuit according to the invention, it is necessary to vary the number of pieces of data for which the mean is calculated, reducing it when it is required to increase the promptness of the circuit, and increasing it for avoiding the influence of anomalous data.

In the exponential damping circuit of FIG. 1 the problem is advantageously resolved because by a simple variation in the value R of the resistance 50 or the time t of closure of the switch 52 or the value C of the condenser 49, it is possible to vary 1/K.

In the circuit shown in FIG. 1 for calculating the mean value of a succession of data, a single analogue memory circuit is used in which the mean value of the data is present; for each successive piece of information this mean value is updated in the manner heretofore described.

From the foregoing description the considerable economical and practical advantages obtained by using the circuit according to the invention for calculating the mean value of a succession of data are evident.

The circuit functions effectively for any number of pieces of data for which the mean value is calculated. It is not necessary to add components if the number of pieces of data increases. The adjustment of the time constants and in general the variation of promptness of the circuit may be obtained automatically.

Various modifications may be made to the control device and circuits illustrated above without leaving the scope of the invention.

What is claimed is:

1. Apparatus for calculating the mean value of a succession of data signals in the form of corresponding voltage levels, comprising:

input means to which said succession of data signals is applied; means for integrating and storing a signal representing the mean value of said succession of data signals at the time of application to said input means of a given data signal $A_i$;

means for comparing the stored signal with a subsequent data signal $A_{i+j}$ applied to said input means;

switch means coupled to said integrating and storing means, said switch means being controlled by data signals applied to said input means to enter succeeding data signals in said integrating and storing means; and means coupled to said integrating and storing means for controlling the change of amplitude of said stored signal as a percentage of the output of said comparison means.

2. Apparatus for calculating the mean value of a succession of data signals in the form of corresponding voltage levels, comprising:

input means to which said succession of data signals is applied;

means for integrating and storing a signal representing the mean value of said succession of data signals at the time of application to said input means of a given data signal $A_i$;

means for comparing the stored signal with a subsequent data signal $A_{i+j}$ applied to said input means, the output of said comparing means being a signal representing the difference between said stored signal and said subsequent input data signal;

switch means coupled to said comparing means and said integrating and storing means; and control means coupled to said switch means for establishing a conductive path between said comparing means and said integrating and storing means for a preset time period to enter the output of said comparing means in said integrating and storing means for said preset time period, said control means being controlled by data signals applied to said input means to enter succeeding data signals in said integrating and storing means.

3. The apparatus as claimed in claim 2, wherein said integrating and storing means comprises an amplifier having a feedback loop including a storage capacitor series connected with said switch means.

4. The apparatus as claimed in claim 3, wherein said switch means comprises an electronic switch controlled by said control means, the latter comprising a monostable circuit adapted to close the electronic switch for a determined period of time after the arrival at said input means of each new data signal.

5. The apparatus as claimed in claim 2, wherein said integrating and storing means and said control means each comprises variable elements for changing their respective time constants.

* * * * *